United States Patent
Diab et al.

(10) Patent No.: US 9,323,311 B2
(45) Date of Patent: Apr. 26, 2016

(54) METHOD AND SYSTEM FOR PACKET BASED SIGNALING BETWEEN A MAC AND A PHY TO MANAGE ENERGY EFFICIENT NETWORK DEVICES AND/OR PROTOCOLS

(75) Inventors: Wael William Diab, San Francisco, CA (US); Howard Frazier, Pleasanton, CA (US)

(73) Assignee: BROADCOM CORPORATION, Irvine, CA (US)

(*) Notice: Subject to any disclaimer, the term of this patent is extended or adjusted under 35 U.S.C. 154(b) by 1060 days.

(21) Appl. No.: 12/470,785

(22) Filed: May 22, 2009

(65) Prior Publication Data

US 2010/0115117 A1    May 6, 2010

Related U.S. Application Data

(60) Provisional application No. 61/111,653, filed on Nov. 5, 2008.

(51) Int. Cl.
*H04W 4/00* (2009.01)
*H04J 3/16* (2006.01)
*G06F 1/32* (2006.01)
*H04L 12/12* (2006.01)

(52) U.S. Cl.
CPC .............. *G06F 1/3234* (2013.01); *H04L 12/12* (2013.01); *Y02B 60/34* (2013.01); *Y02B 60/35* (2013.01); *Y02B 60/43* (2013.01); *Y02B 60/44* (2013.01)

(58) Field of Classification Search
CPC . H04L 67/28; H04L 61/6013; H04L 61/2015; H04L 29/1282; H04L 12/12
See application file for complete search history.

(56) References Cited

U.S. PATENT DOCUMENTS

| | | | |
|---|---|---|---|
| 6,463,542 B1 * | 10/2002 | Yu et al. | 713/320 |
| 6,795,450 B1 | 9/2004 | Mills et al. | |
| 2002/0157030 A1 * | 10/2002 | Barker et al. | 713/320 |
| 2006/0034295 A1 | 2/2006 | Cherukuri et al. | |
| 2007/0280239 A1 | 12/2007 | Lund | |
| 2008/0304519 A1 * | 12/2008 | Koenen et al. | 370/477 |
| 2009/0030970 A1 * | 1/2009 | Siegmund | 709/202 |
| 2009/0327506 A1 * | 12/2009 | Diab | 709/230 |

* cited by examiner

*Primary Examiner* — Melanie Jagannathan
(74) *Attorney, Agent, or Firm* — Foley & Lardner LLP (57) ABSTRACT

In an Ethernet network comprising link partners that are coupled via an Ethernet link, an energy efficient network (EEN) communication control policy may be established above a MAC layer. The EEN control policy may determine a power level mode of operation for the link partners. Power level mode control data may be communicated from hardware, software and/or firmware of upper layer protocols to PHY devices. The control data may specify when, where and/or how long to implement the power level mode. The control data may be communicated via a "magic" packet comprising start and/or end of frame delimiters and bits that indicate the power level mode. The PHY devices may detect, parse and/or interpret the "magic" packet and may enter and/or exit a lower power mode of operation. The PHY devices may respond to by generating a magic packet and sending the packet to upper layers.

20 Claims, 8 Drawing Sheets

METHOD AND SYSTEM FOR PACKET BASED SIGNALING BETWEEN A MAC AND A PHY TO MANAGE ENERGY EFFICIENT NETWORK DEVICES AND/OR PROTOCOLS

CROSS-REFERENCE TO RELATED APPLICATIONS/INCORPORATION BY REFERENCE

This application makes reference to, claims priority to, and claims the benefit of U.S. Provisional Application Ser. No. 61/111,653, filed on Nov. 5, 2008, entitled "METHOD AND SYSTEM FOR IMPLEMENTING AND MANAGING ENERGY EFFICIENT NETWORKS," which is incorporated herein by reference in its entirety.

This application also makes reference to:
U.S. patent application Ser. No. 12/470,970 filed May 22, 2009;
U.S. patent application Ser. No. 11/685,554 filed Mar. 13, 2007; and
U.S. patent application Ser. No. 11/473,205 filed Jun. 22, 2006.

Each of the above stated applications is hereby incorporated herein by reference in its entirety.

FIELD OF THE INVENTION

Certain embodiments of the invention relate to networking. More specifically, certain embodiments of the invention relate to a method and system for packet based signaling between a MAC and a PHY to manage energy efficient network devices and/or protocols.

BACKGROUND OF THE INVENTION

Communications networks and in particular Ethernet networks, are becoming an increasingly popular means of exchanging data of various types and sizes for a variety of applications. In this regard, Ethernet networks are increasingly being utilized to carry voice, data, and multimedia traffic. Accordingly more and more devices are being equipped to interface to Ethernet networks. Broadband connectivity including internet, cable, phone and VOIP offered by service providers has led to increased traffic and more recently, migration to Ethernet networking. Much of the demand for Ethernet connectivity is driven by a shift to electronic lifestyles involving desktop computers, laptop computers, and various handheld devices such as smart phones and PDA's. Applications such as search engines, reservation systems and video on demand that may be offered at all hours of a day and seven days a week, have become increasingly popular.

These recent developments have led to increased demand on datacenters, aggregation, high performance computing (HPC) and core networking. As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for packet based signaling between a MAC and a PHY to manage energy efficient network devices and/or protocols, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for packet based signaling between a MAC and a PHY to manage energy efficient network devices and/or protocols. In an Ethernet network comprising link partners that are coupled via an Ethernet link, an energy efficient network (EEN) communication control policy may be established above a media access control layer by one or more OSI upper layer protocols. The EEN communication control policy may determine a power level mode of operation for one or both of the link partners. In this regard, one or more of the OSI upper layer protocols may communicate control data comprising the determined power level mode to one or more physical layer (PHY) devices in one or more of the link partners. The power level mode of operation may be implemented by one of more of the PHY devices based on the communicated control data. Hardware, software and/or firmware may be utilized by one or more of the OSI upper layer protocols to establish and/or manage the EEN communication control policy. The control data may comprise information specifying when, where and/or how long to implement the power level mode of operation.

In various embodiments of the invention, the control data for the power level mode of operation may be communicated via a "magic" packet. The magic packet may comprise a start of frame delimiter, an end of frame delimiter and one or more bits that indicate the power level mode of operation. One or more of the PHY devices may detect, parse and/or interpret the "magic" packet. Accordingly, the one or more PHY devices and/or the network devices may enter and/or exit a lower power mode of operation based on the communicated control data. While transitioning to an altered power level mode, the PHY device may buffer packets that are pending transmission by the PHY device. Furthermore, the one or more OSI upper layer protocols may buffer packets that are pending transmission by the PHY device while transitioning to an altered power level mode of operation.

Figure 1:
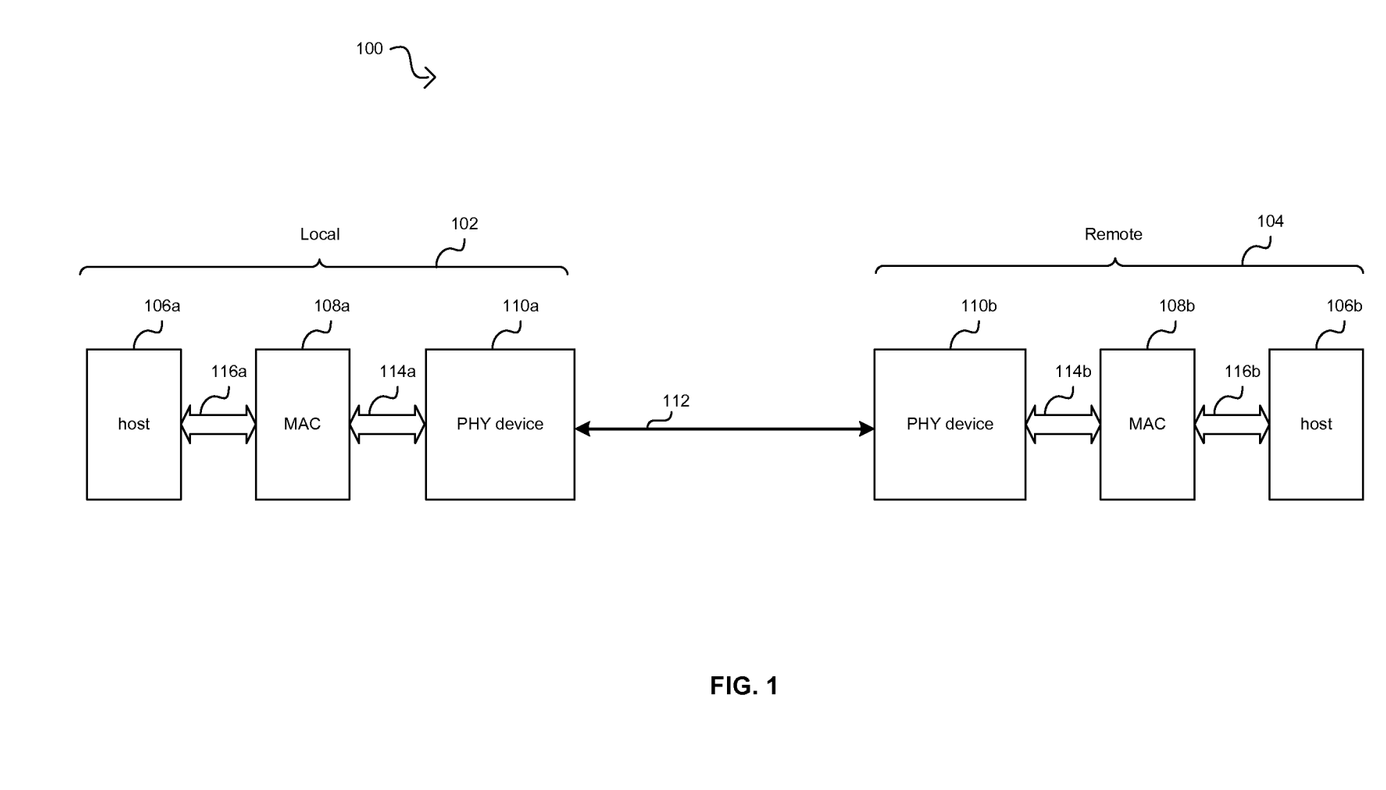
FIG. 1 is a block diagram illustrating an exemplary Ethernet connection between two network devices, in accordance with an embodiment of the invention.

FIG. 1 is a block diagram illustrating an exemplary Ethernet connection between a two network devices, in accordance with an embodiment of the invention. Referring to FIG. 1, there is shown a system 100 that comprises a network device 102 and a network device 104. In addition, there is shown two hosts 106a and 106b, two MAC controllers 108a and 108b, two PHY devices 110a and 110b, two controllers 114a and 114b, two bus controller interfaces 116a and 116b and a link 112

The network devices 102 and 104 may communicate via the link 112. The Ethernet link 112 is not limited to any specific medium and may utilize any suitable medium. Exemplary Ethernet link 112 media may comprise copper, optical and/or backplane technologies. For example, a copper medium such as STP, Cat3, Cat 5, Cat 5e, Cat 6, Cat 7 and/or Cat 7a as well as ISO nomenclature variants may be utilized. Additionally, copper media technologies such as InfiniBand, Ribbon and backplane may be utilized. With regard to optical media for the Ethernet link 112, single mode fiber as well as multi-mode fiber may be utilized.

In an exemplary embodiment of the invention, the link 112 may comprise up to four or more physical channels, each of which may, for example, comprise an unshielded twisted pair (UTP). The network device 102 and the network device 104 may communicate via two or more physical channels comprising the link 112. For example, Ethernet over twisted pair standards 10BASE-T and 100BASE-TX may utilize two pairs of UTP while Ethernet over twisted pair standards 1000BASE-T and 10GBASE-T may utilize four pairs of UTP. In this regard, however, aspects of the invention may enable varying the number of physical channels via which data is communicated.

In an exemplary embodiment of the invention, the network devices 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In another exemplary embodiment of the invention, the network devices 102 and/or 104 may comprise a backplane PHY capable of operating at one or more standard rates such as 10 Gbps (10 GBASE-KX4 and/or 10 GBASE-KR); and/or non-standard rates such as 2.5 Gbps and 5 Gbps.

In another exemplary embodiment of the invention, the network devices 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the network devices 102 and/or 104 may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the network devices 102 and/or 104.

The network device 102 may comprise a host 106a, a medium access control (MAC) controller 108a, and a PHY device 104a. The network device 104 may comprise a host 106b, a MAC controller 108b, and a PHY device 110b. Notwithstanding, the invention is not limited in this regard. In various embodiments of the invention, the network device 102 and/or 104 may comprise, for example, one or more of a switch, end point, router, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the network devices 102 and 104 may be enabled to utilize Audio/Video Bridging and/or Audio/video bridging extensions (collectively referred to herein as audio video bridging or AVB) for the exchange of multimedia content and associated control and/or auxiliary data.

The PHY devices 110a and 110b may each comprise suitable logic, circuitry, and/or code that may enable communication, for example, transmission and reception of data, between the network device 102 and the network device 104. The PHY devices 110a and 110b may support, for example, Ethernet over copper, Ethernet over fiber, and/or backplane Ethernet operations. The PHY devices 110a and 110b may enable multi-rate communications, such as 10 Mbps, 100 Mbps, 1000 Mbps (or 1 Gbps), 2.5 Gbps, 4 Gbps, 10 Gbps, or 40 Gbps, for example. In this regard, the PHY devices 110a and 110b may support standard-based data rate limits and/or non-standard data rate limits. Moreover, the PHY devices 110a and 110b may support standard Ethernet link lengths or ranges of operation and/or extended ranges of operation. The PHY devices 110a and 110b may enable communication between the network device 102 and the network device 104 by utilizing a link discovery signaling (LDS) operation that enables detection of active operations in the other network device. In this regard the LDS operation may be configured to support a standard Ethernet operation and/or an extended range Ethernet operation. The PHY devices 110a and 110b may also be operable to support autonegotiation, which may for example, be utilized to identify and/or select communication parameters such as speed and duplex mode.

In various embodiments of the invention, the PHY devices 110a and 110b may comprise suitable logic, circuitry, and/or code that may enable transmission and/or reception at a high (er) data in one direction and transmission and/or reception at a low(er) data rate in the other direction. For example, the network device 102 may comprise a multimedia server and the network device 104 may comprise a multimedia client. In this regard, the network device 102 may transmit multimedia data, for example, to the network device 104 at high(er) data rates while the network device 104 may transmit control or auxiliary data associated with the multimedia content at low (er) data rates.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example.

In an exemplary embodiment of the invention illustrated in FIG. 1, the hosts 106a and 106b may implement OSI layer 3 and above, the MAC controllers 108a and 108b may implement OSI layer 2 and above and the PHY devices 110a and 110b may implement the operability and/or functionality of OSI layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the link 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers. The hosts 106a and/or 106b may comprise management and control functions that may be implemented by software, hardware and/or a combination of software and hardware.

The PHY devices 110a and 110b may be configured to handle physical layer requirements, which comprise, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the link 112 and/or to decode data packets received from the link 112.

The MAC controller 108a may comprise suitable logic, circuitry, and/or code that may enable handling of data link layer, layer 2, operability and/or functionality in the network device 102. Similarly, the MAC controller 108b may comprise suitable logic, circuitry, and/or code that may enable handling of layer 2 operability and/or functionality in the network device 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate capable interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of physical channels having a fixed data rate limit which may result in network links being underutilized and transmitting IDLE symbols for significant portions of time. In this regard, when the network devices 102 and 104 initiate a connection, they may exchange some preliminary information and/or training signals. In this regard, the network devices 102 and 104 may negotiate a data rate limit (e.g., 10 Gbps) and duplex mode (e.g., full-duplex) for communicating with each other. Additionally, in order to establish reliable communications, each of the network devices 102 and 104 may need to "train" or adjust various parameters and/or circuitry in a network device to account for variables such as the type of cabling over which data is being communicated and the environmental conditions (e.g. temperature) surrounding the cabling. Once the network devices are "trained", they may initially transmit data at 10 Gbps, for example. In this regard, conventional PHY devices may distribute traffic evenly over all available physical channels and may continuously transmit IDLE symbols between packets of actual data. However, based, for example, on link utilization, past or present traffic statistics, and/or available resources (e.g., power, buffer space, processor time, etc.), it may be determined that 10 Gbps may be higher than necessary or desired. Accordingly, controlling the data rate limit of the connection between the network devices 102 and 104 may enable the network devices 102 and 104 to communicate in a more energy efficient manner. Moreover, while the data rate limit on the link 112 may be low(er), higher layer functions and/or resources, such as portions of the MAC controller may be placed into a low(er) power mode. The data rate limit may be controlled by, for example, controlling a number of physical channels utilized to communicate data, controlling the signal constellation utilized for representing data on the link, controlling a rate at which symbols are transmitted, and controlling the length of time between frames (the inter-frame gap). In this manner, aspects of the invention may enable network designers and/or administrators to control, with fine precision via a plurality of data rate variables, a data rate limit on an Ethernet link. At any given time instant, the data rate limit may determine the maximum data rate which the link may support at that instant. In instances that the actual data rate on the link is less than the data rate limit, the difference between the data rate limit and the actual data rate may correspond to wasted energy on the link and/or in network devices communicatively coupled to the link. Accordingly, the increased resolution with which the data rate limit may be controlled, via the plurality of variables, may enable reducing the difference between the data rate limit and the actual data rate; thus improving energy efficiency of the link and/or network devices communicatively coupled to the link.

In various embodiments of the invention, a data rate limit of a network link may be controlled to meet demands on the link, and this may result in a fixed actual data rate on the link which may effectively reduce or eliminate issues associated with links transporting bursty traffic. For example, controlling and/or determining traffic attributes (e.g., inter-frame gap times and network latencies) and/or network resources (e.g., buffer capacity and utilization) may be simplified when dealing with fixed rate traffic. Moreover, certain traffic types, such as video and audio streams, may inherently be of a fixed actual data rate and may thus lend themselves to efficient transmission over a link utilizing a fixed data rate limit.

Figure 2:
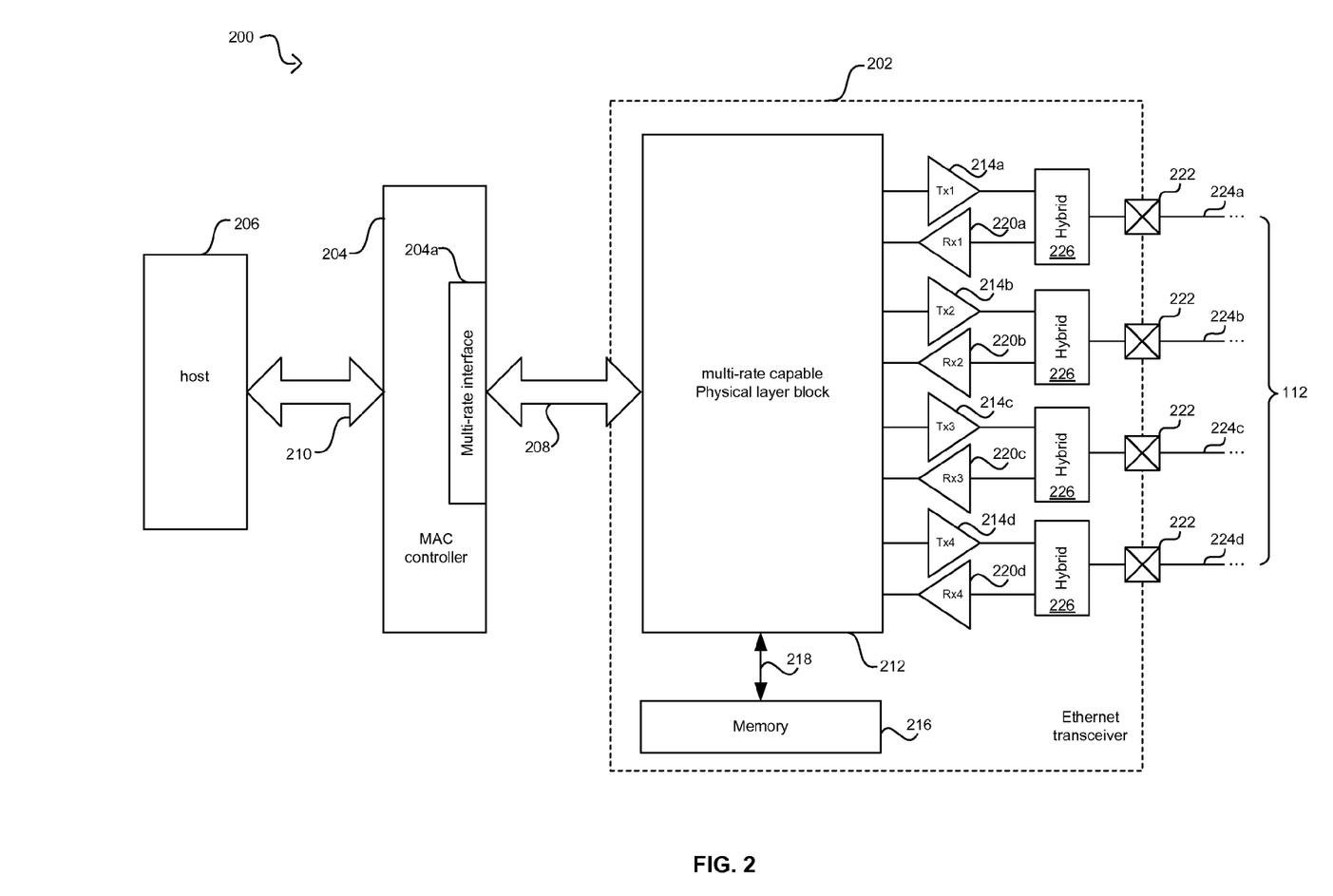
FIG. 2 is a block diagram illustrating an exemplary Ethernet over twisted pair PHY device architecture comprising a multi-rate capable physical block, in accordance with an embodiment of the invention.

FIG. 2 is a block diagram illustrating an exemplary Ethernet over twisted pair PHY device architecture comprising a multi-rate capable physical block, in accordance with an embodiment of the invention. Referring to FIG. 2, there is shown a network device 200 which may comprises an Ethernet over twisted pair PHY device 202, a MAC controller 204, a host 206, an interface 208, and a bus controller interface 210. The PHY device 202 may be an integrated device which may comprise a multi-rate capable physical layer block 212, one or more transmitters 214, one or more receivers 220, a memory 216, a memory interface 218, and one or more input/output interfaces 222.

The PHY device 202 may be an integrated device that comprises a multi-rate capable physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise a multi-rate capable interface 204a that may comprise suitable logic, circuitry, and/or code to enable communication with the PHY device 202 at a plurality of data rates via the interface 208.

The multi-rate capable physical layer block 212 in the PHY device 202 may comprise suitable logic, circuitry, and/or code that may enable operability and/or functionality of physical layer requirements. In this regard, the multi-rate capable physical layer block 212 may enable generating the appropriate link discovery signaling utilized for establishing communication with a remote PHY device in a remote network device. The multi-rate capable physical layer block 212 may communicate with the MAC controller 204 via the interface 208. In one aspect of the invention, the interface 208 may be a media independent interface (MII) and may be configured to utilize a plurality of serial data lanes for receiving data from the multi-rate capable physical layer block 212 and/or for transmitting data to the multi-rate capable physical layer block 212. The multi-rate capable physical layer block 212 may be configured to operate in one or more of a plurality of communication modes, where each communication mode may implement, for example, a different communication protocol. These communication modes may include, but are not limited to, Ethernet over twisted pair standards 10 BASE-T, 100 BASE-TX, 1000 BASE-T, 10 GBASE-T, and other similar protocols that utilize multiple physical channels between network devices. The multi-rate capable physical layer block 212 may be configured to operate in a particular mode of operation upon initialization or during operation. For example, autonegotiation may utilize the FLP bursts to establish a rate (e.g. 10 Mbps, 100 Mbps, 1000 Mbps, or 10 Gbps) and mode (half-duplex or full-duplex) for transmitting information.

The multi-rate capable physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the multi-rate capable physical layer block 212. The parameters may comprise configuration data and the code may comprise operational code such as software and/or firmware, but the information need not be limited in this regard. Moreover, the parameters may include adaptive filter and/or block coefficients for use, for example, by the multi-rate capable physical layer block 212 and/or the hybrids 226.

Each of the transmitters 214a, 214b, 214c, 214d may comprise suitable logic, circuitry, interface and/or code that may enable transmission of data from the network device 200 to a remote network device via, for example, the link 112 in FIG. 1. The receivers 220a, 220b, 220c, 220d may comprise suitable logic, circuitry, interface(s) and/or code that may enable receiving data from a remote network device. Each of the transmitters 214a, 214b, 214c, 214d and receivers 220a, 220b, 220c, 220d in the PHY device 202 may correspond to a physical channel that may comprise the link 112. In this manner, a transmitter/receiver pair may interface with each of the physical channels 224a, 224b, 224c, 224d. In this regard, the transmitter/receiver pairs may be enabled to provide the appropriate communication rate and mode for each physical channel.

The input/output interfaces 222 may comprise suitable logic circuitry, and/or code that may enable the PHY device 202 to impress signal information onto a physical channel, for example a twisted pair of the link 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium of the physical channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the network device 200 may comprise a number of hybrids 226 corresponding to the number of physical links. Each hybrid 226 may comprise suitable logic, circuitry, interface and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the network device 300 may be communicatively coupled to an input/output interface 222.

In operation, the network device 200 may communicate with a remote partner via the link 112. For example, for 10 Gbps Ethernet, the network device 200 may transmit data to and receive data from a remote partner via the physical channels 224a, 224b, 224c, and 224d. In this regard, when there is no data for the network device 200 to transmit, then it may transmit IDLE symbols to keep itself and/or the remote partner "trained". In this manner, power consumption of a network may be largely independent of the amount of actual data being transmitted over the network. Accordingly, controlling the data rate limit on the link 112 may enable the network devices 200 to transmit fewer IDLE symbols and thus communicate in a more energy efficient manner.

The network device 200 may disable, or put into a low(er) power state, one or more of the physical channels 224, when those one or more physical channels are not required to meet current and/or future demand of the link. In this manner, transmitters 214, receivers 220, hybrids 226, and/or portions of the multi-rate capable PHY block 212 associated with the unused physical channels may be disabled. A channel in a low(er) power state may operate in one or more ways. For example, one or more channels may convey little or no data, may be silent, may convey IDLE symbols and/or convey other energy. In some instances, all channels of a link may be placed into a low(er) power state. Furthermore, the PHY device 202 as well as the MAC controller 204 may be put to sleep.

The PHY device 202 and/or one or more components implementing the layers above the PHY layer may be placed in a low power idle mode (LPI) wherein the PHY device 202 and/or higher layer components may be powered down during idle periods. During power down, the PHY device 202 may maintain various coefficients and may maintain synchronization to allow for a more rapid return to an active state. In addition, during LPI mode, a portion of the receiver circuitry may be turned off. In asymmetric systems, devices that handle one direction of communication may be in a quiet state independent of devices that handle communication in an opposite direction. In synchronous systems, both directions of a PHY device may enter and/or leave a quiet state together. Although a PHY device may operate in a synchronous mode, OSI layers above the PHY may operate in an asymmetric mode.

In various embodiments of the invention, a low(er) power state may be enabled wherein channels of a link may remain active and a data rate limit on each of the channels may be controlled by adjusting a signal constellation, PAM levels, an IFG, and/or a symbol rate.

Figure 3:
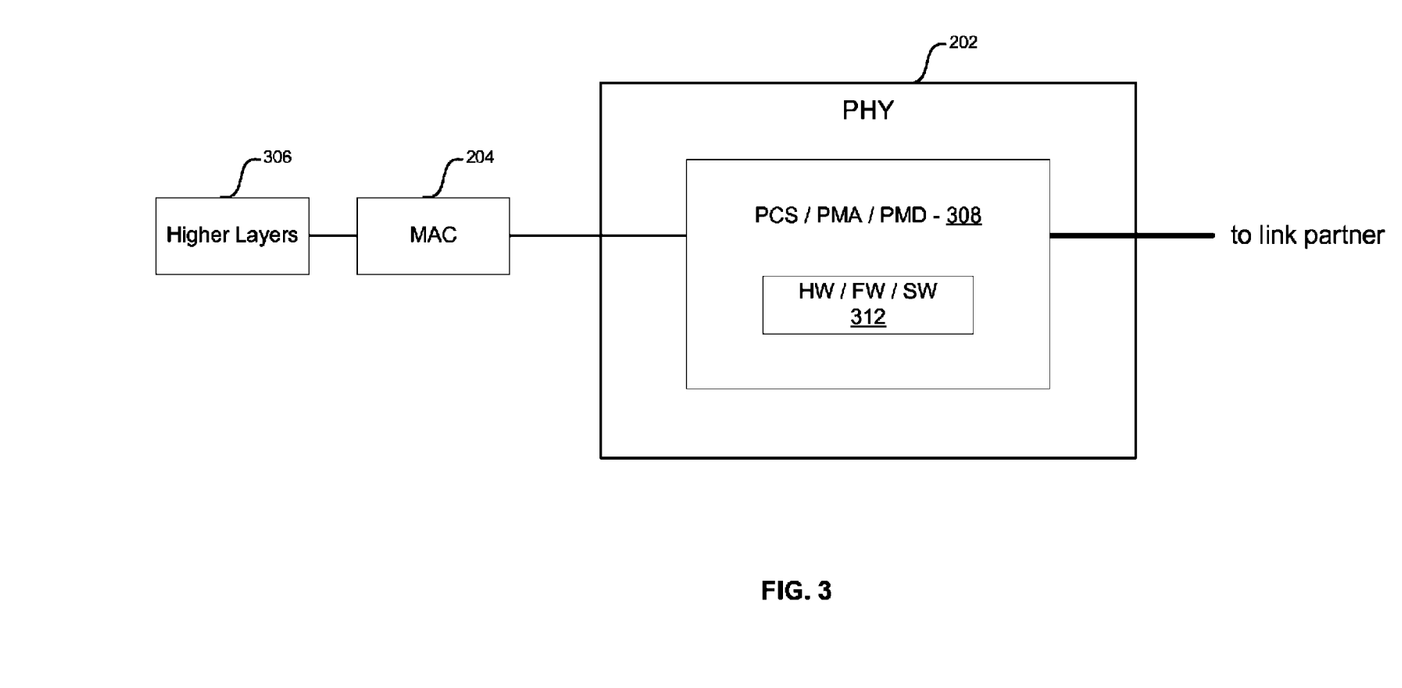
FIG. 3 is a block diagram illustrating an exemplary PHY device that is operable to implement energy efficient networking control policy utilizing packet based signaling for energy efficient networking, in accordance with an embodiment of the invention.

FIG. 3 is a block diagram illustrating an exemplary PHY device that is operable to implement EEN control policy utilizing packet based signaling, in accordance with an embodiment of the invention. Referring to FIG. 3, there is shown a block for layers above the MAC layer 306, the MAC 204 and the PHY device 202. The PHY device 202 may comprise a physical coding sub-layer (PCS), physical media attachment (PMA) and/or a physical media dependent (PMD) module 308. The PCS, PMA and PMD module 308 may comprise a hardware, firmware and/or software module 312.

The MAC 204 and the PHY 202 are described with respect to FIG. 1 and FIG. 2. The layers above the MAC layer 306 are OSI layers that may comprise the host 206 layer and/or the interfaces 208 and 210 described with respect to FIG. 1 and FIG. 2.

The layers above the MAC 306 may comprise the EEN control policy. Management of the control policy by the layers above the MAC 306 may comprise approximating and/or monitoring transmit and/or receive traffic and/or determining when to enter and/or exit low(er) power modes. In addition, the EEN control policy may take into consideration latency constraints of various types of traffic in order to determine wake and/or sleep periods. Latency may be introduced while a PHY may transition from a period of low(er) power or a sleep period to a period of operation at a higher power. For example, in instances when latency is tolerable, a series of traffic bursts may be buffered for an acceptable amount of time before waking the PHY device 202 for delivery of the accumulated traffic bursts.

The PHY device 202 may comprise suitable logic, circuitry, interfaces and/or code that may be operable to improve energy efficiency for one or more PHY interfaces. In this regard, the PHY 202 may be operable to enter a low power idle mode (LPI) and/or may lower its data rate to reduce power consumption. EEN control policy decisions regarding when to enter and/or exit a low(er) power mode may originate from layers above the MAC layer 306.

In various embodiments of the invention, the PHY device 202 may be operable to receive control policy management signals indicating when to go into a reduced power mode and/or when to exit the reduced power mode. The signals may be received from one or more layers above the PHY layer and may be embedded in an EEN control packet, for example, a "magic" packet.

The PHY device 202 may comprise the PCS, PMA and/or PMD module 308 which may comprise suitable logic, circuitry, interfaces and/or code that may be operable to perform one or more of physical encoding and/or decoding, PMA framing and transmitter and/or receiver operations. In addition, the PHY device 202 may comprise the hardware, firmware and/or software module 312 that may be operable to implement reduced power modes within the PHY device 202. For example, the hardware, firmware and/or software module 312 may be operable to monitor and/or parse EEN control policy "magic' packets received by the PHY device 202 that may comprise information about entering and/or exiting a low(er) power mode and/or may request statistics. In various embodiments of the invention, the PHY device 202 may be operable to return a packet to the layers above the MAC layer 306, for example, to return statistics information.

In operation, the EEN control policy may be managed by the layers above the MAC layer 306 and may be communicated to the PHY device 202 via packet based signaling. In this regard, the layers above the MAC layer 306 may comprise suitable logic, circuitry, interfaces and/or code to monitor hardware, firmware, software and/or one or more buses to determine when a low(er) power mode of operation may be sufficient to handle traffic flowing through the system 100. Packets that may assert a low(er) power mode for the PHY device 202 may be communicated from the layers above the MAC layer 306 to the PHY device 202. EEN control packets may by-pass the MAC controller 204. In this manner, an EEN control policy may be implemented without a costly modification to the MAC 108 and other hardware.

Figure 4A:
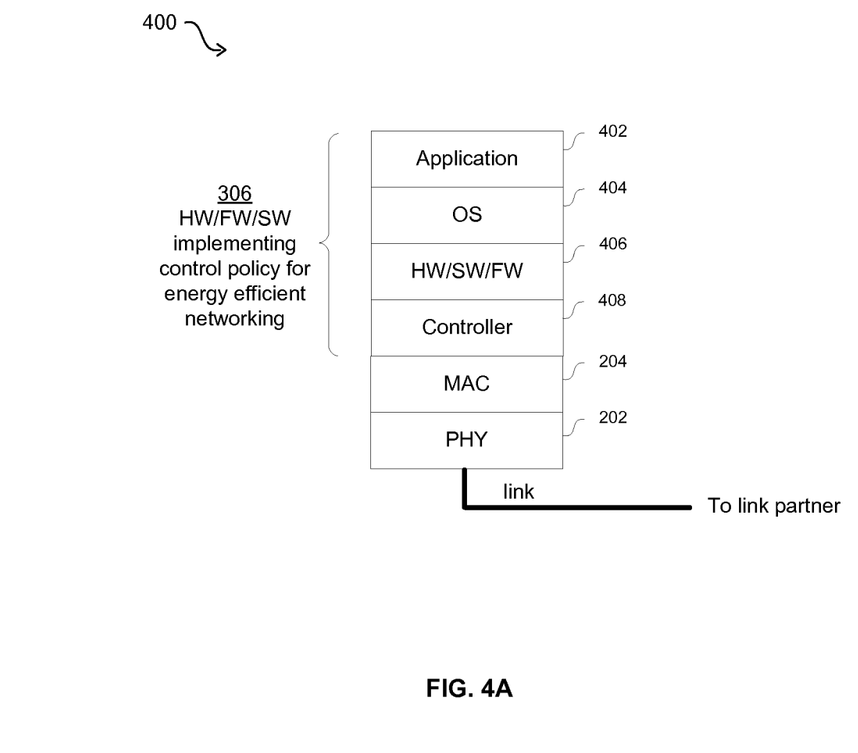
FIG. 4A is a block diagram illustrating layers within an exemplary device that are operable to manage an energy efficient control policy utilizing control packets, in accordance with an embodiment of the invention.

FIG. 4A is a block diagram illustrating layers within an exemplary device that are operable to manage an energy efficient control policy utilizing control packets, in accordance with an embodiment of the invention. Referring to FIG. 4A, there is shown, a network device 400 that may comprise the PHY device 202, the MAC controller 204, a controller layer 408, a hardware, software and/or firmware (HW, SW, FW) system 406, an operating system layer (OS) 404 and an application layer 402.

The PHY device 202 and the MAC controller 204 are described with respect to, for example, FIG. 1, FIG. 2 and FIG. 3. The controller layer 408, the hardware, software and/or firmware (HW, SW, FW) system 406, the operating system layer 404 and the application layer 402 may be OSI layers that may be similar or substantially the same as the layers above the MAC 306 described with respect to FIG. 3. Although the network device 400 comprises a controller layer 408 the invention is not so limited. For example, the network device 400 may comprise a switch, a router and/or endpoint that may be operable to generate a packet via software.

One or more layers above the MAC layer 204 that may comprise, for example, the controller layer 408, the HW, SW, FW system 406, the operating system layer (OS) 404 and the application layer 402, may comprise the EEN control policy. The one or more layers above the MAC may be operable to generate magic packets and communicate them to the PHY device 202. The magic packet may comprise EEN control policy information. For example, the magic packet may comprise instructions and/or information regarding entering and/or exiting a low(er) power mode and/or requests for statistical information from the PHY device 202. In addition, the layers above the MAC layer 204 may be operable to receive packets generated by the PHY comprising information for the EEN control policy.

The MAC 204 may each comprise suitable logic, circuitry, interfaces and/or code that may enable reception of Ethernet payloads from the application layer 402 and/or OS layer 404 via the controller layer 408 and/or HW, SW, FW system 406. In this regard, the Ethernet payloads may comprise EEN control packets that may comprise instructions for entering and/or exiting a low(er) power mode. The controller layer 408 may be implemented in software, hardware and/or firmware. The MAC 204 may be operable to encapsulate the Ethernet payloads into one or more Ethernet frames. Additionally, the MAC 204 may be operable to decapsulate the Ethernet frames to extract Ethernet payloads. The Ethernet payloads may comprise packets generated by the PHY device 202 that may be sent by the PHY to layers above the MAC layer in response to EEN control policy requests. Other Ethernet payloads may comprise, for example, multimedia, auxiliary, control, or general Ethernet data. Ethernet payloads may be formatted and/or encapsulated according to one or more protocols. Other protocols may be utilized for the packetization and/or conveyance of data without deviating from the scope of the present invention. For example, IP may be utilized. Furthermore, control packets may comprise a non-standard size, for example, they may be shorter than a 64 byte Ethernet packet.

The network device 400 may comprise suitable logic, circuitry, interfaces and/or code that may be operable to communicate data to a network device via an Ethernet network. The network device 400 may be physically and/or logically divided into a plurality of OSI layers comprising the PHY device 202, the MAC 204, the controller layer 408, the HW, SW, FW system 406, the operating system layer 404 and the application layer 402.

In operation, the network device 400 may comprise a video server that may distribute multimedia data via an Ethernet network, for example. An energy efficient network (EEN) control policy may be implemented within the network device 400 at a layer above the MAC controller 204, for example, the controller layer 408 or higher. One or more layers above the MAC controller 204 may determine when the PHY device 202 and/or portions of the MAC controller 204 may enter and/or exit a low(er) power mode. In this regard, the layers above the MAC controller 204 may monitor and/or estimate past, present, and/or future traffic to determine when the PHY device 202 may enter a low(er) power mode and/or when it may exit a low(er) power mode. For example, the application layer 402 and/or the OS layer 404 may be aware when multimedia data may be forthcoming or may know when there isn't any data pending transmission. The higher layers may be operable to communicate such status to the PHY device 202. In this regard, layers in the stack above the MAC controller 204 layer may be operable to generate an EEN "magic" packet and send it to the PHY device 202. The EEN "magic" packet may comprise EEN control policy data that may indicate to the PHY device 202 that it may enter into or may exit out of a low(er) power mode. In addition, EEN "magic" packet data may provide information about how long to sustain a particular power mode and/or when to look for another EEN control packet, for example. The "magic packet" may comprise a request for statistics data from the PHY device 202.

Figure 4B:
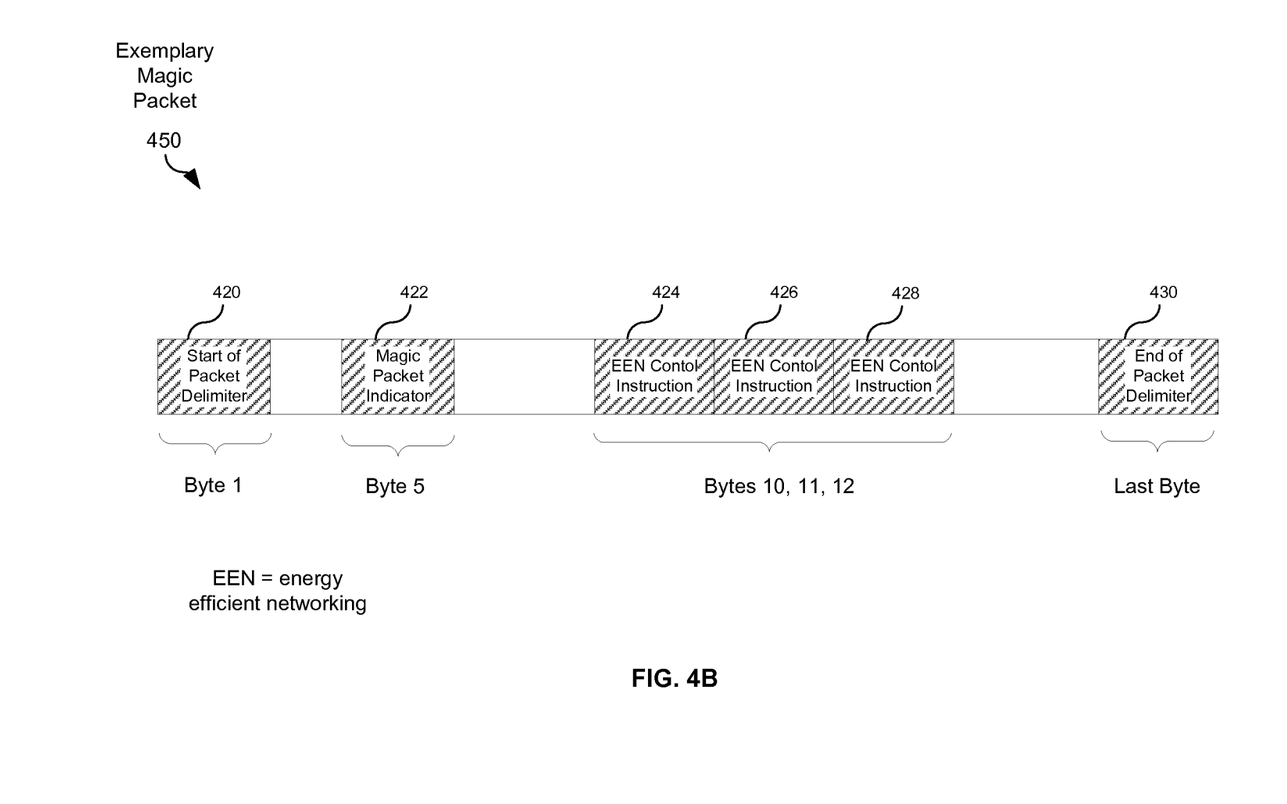
FIG. 4B is a block diagram illustrating an exemplary energy efficient network control packet, in accordance with an embodiment of the invention.

FIG. 4B is a block diagram illustrating an exemplary energy efficient network control packet, in accordance with an embodiment of the invention. Referring to FIG. 4B there is shown an exemplary magic packet 450 that may comprise a start of packet delimiter byte 420, a magic packet indicator byte 422, EEN control bytes 424, 426 and 428 and an end of packet delimiter 430.

The exemplary magic packet 450 may comprise a standard length packet or may be shorter or longer depending on whether a MAC may be operable to process a shorter or longer length packet. The magic packet 450 may begin with a byte that indicates the beginning of the packet, for example, the start of packet delimiter 420. A specified number of bytes after the start of packet delimiter 420, the magic packet may comprise one or more bytes that may indicate whether or not the packet is a magic packet. For example, the fifth byte may be the magic packet indicator byte 422. Other specified bytes, for example, the tenth, eleventh and twelfth bytes may be EEN control bytes 242, 226 and 428 that may comprise EEN control information and/or requests. For example the EEN control information may comprise instructions with regard to entering and/or exiting a low(er) power mode or may request statistical information from the PHY device 202. The last byte of the magic packet 450 may comprise an end of packet delimiter 430.

Similarly, when the PHY device 202 may receive a magic packet that may request status of the PHY or statistical information, for example, the PHY device may generate a response control packet for the higher layers. For example, the response packet may comprise a start of packet delimiter, a control packet indicator, one or more response data bytes and an end of packet delimiter. The response packet may be sent via the MAC controller 204 to the layers above the MAC layer 306 that requested the information.

Figure 4C:
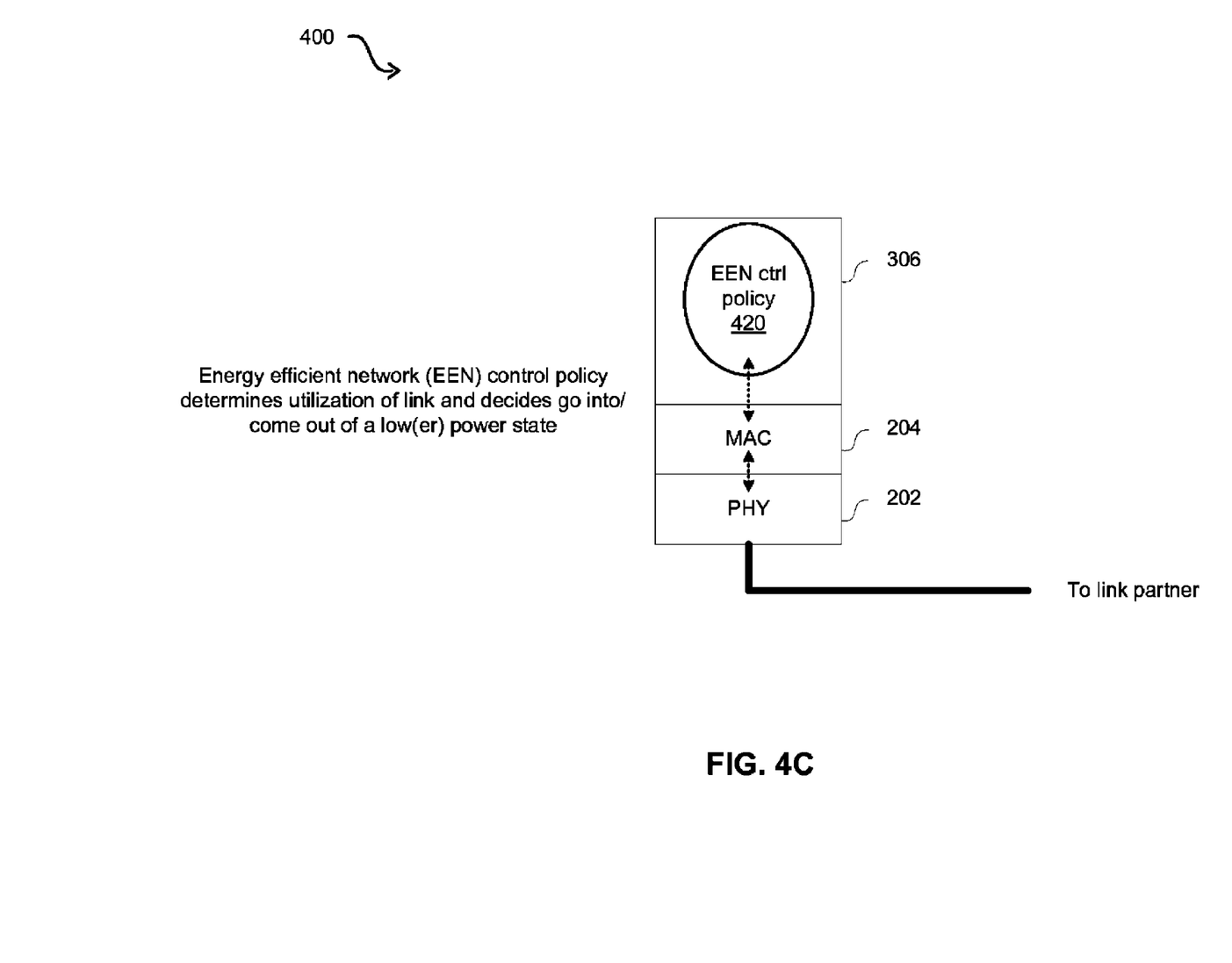
FIG. 4C is a block diagram illustrating exemplary communication of energy efficient network control policy information between a PHY layer and a layer above the MAC, in accordance with an embodiment of the invention.

FIG. 4C is a block diagram illustrating exemplary communication of energy efficient network control policy information between a PHY layer and a layer above the MAC, in accordance with an embodiment of the invention. Referring to FIG. 4C, there is shown, the network device 400 that may comprise the PHY device 202, the MAC controller 204, the layers above the MAC layer 306 and the energy efficient network (EEN) control policy 420.

The network device 400 is described with respect to FIG. 4A. The PHY device 202, the MAC controller 204 and the layers above the MAC layer 306 are described with respect to, for example, FIG. 1, FIG. 2, FIG. 3 and FIG. 4A. The layers above the MAC layer 306 may comprise the controller layer 408, the HW, SW, FW system 406, the operating system layer 404 and the application layer 402 described with respect to FIG. 4A.

The EEN control policy 420 may be implemented by one or more of software, firmware and/or hardware within the layers above the MAC layer 306. For example, the control policy 420 may be implemented entirely in software, entirely in firmware, entirely in hardware and/or in a combination of software, hardware and/or firmware. Based on the EEN control policy 420, traffic available for transmission to a link partner and/or received traffic may be monitored by the network device 400.

In operation, the network device 400 may be a video server and the EEN control policy 420 may enable determining when multimedia data may be pending transmission by the PHY device 202 to a link partner. In instances when the network device 400 may be in a low(er) power mode an EEN "magic" packet may be generated according to the EEN control policy 420 to inform the PHY device 202 to exit LPI mode and wake up. The PHY device 202 may receive and parse the EEN "magic" packet. The PHY device 202 and/or other device layers within the network device 400 layers may need time to transition logic, circuitry, interfaces and/or code to become fully awake and able to effectively transmit the multimedia data across a link. Accordingly, the EEN control policy 420 may enable buffering of the impending multimedia data until the PHY device 202 may be ready to transmit the multimedia data to the link partner.

In instances when the network device 400 may be in an active state and multimedia data may not be available for transmission, the PHY device 202 may be instructed, according to the control policy 420, to transition to a low(er) power mode via an EEN "magic" packet.

An exemplary EEN control policy instruction to the PHY device 202 may indicate to the PHY that entering and/or exiting an LPI mode for data transmission resources may only be implemented when data receive resources in the PHY device 202 enter and/or exit the LPI mode.

Figure 4D:
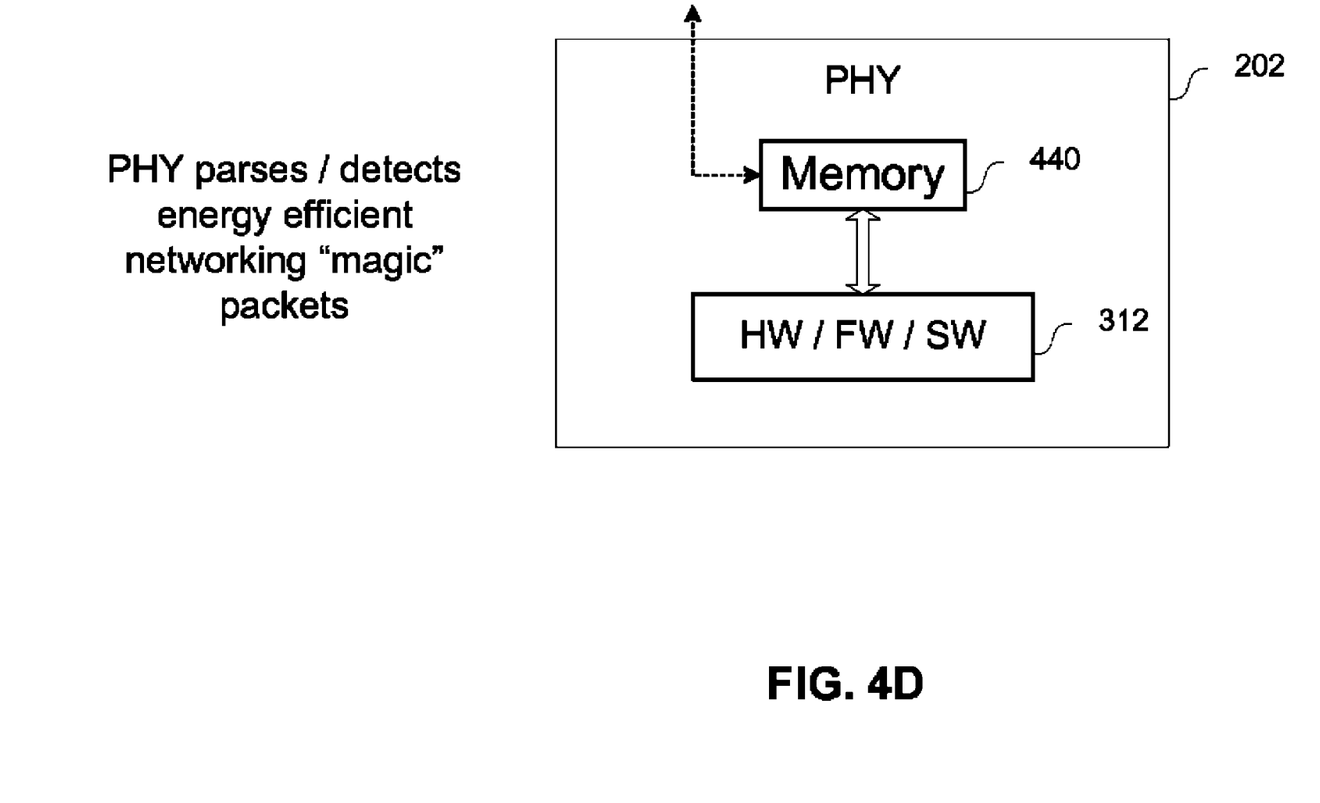
FIG. 4D is a block diagram illustrating exemplary reception of an energy efficient network control policy instruction by a physical layer device, in accordance with an embodiment of the invention.

FIG. 4D is a block diagram illustrating exemplary reception of an energy efficient network control policy instruction by a physical layer device, in accordance with an embodiment of the invention. Referring to FIG. 4D, there is shown the PHY device 202, the memory 440 and a hardware, firmware and/or software module 312.

The hardware, firmware and/or software module 312 are described with respect to, for example, FIG. 3. The memory 440 may comprise enough memory that may be suitable to store at least one byte of data. In this regard, a packet handled by the memory 440 may incur little or no latency.

In operation, the PHY device 202 may receive via the MAC controller 204, one or more EEN "magic" packets, or other signal or message, from one or more layers above the PHY layer of the network device 400. An EEN "magic" packet may be similar to a conventional packet in that it may comprise a start of frame delimiter and an end of frame delimiter, but may differ in that it may comprise a distinct sequence or pattern of bits and/or characters which may not occur in conventional packets. The PHY device 202 may store received packet data in the memory 440. The hardware, firmware and/or software module 312 may inspect the packets in order to identify the EEN "magic" packets and may determine contents of the EEN "magic" packets. For example, the hardware, software and/or firmware module 312 may look for a start of packet delimiter and/or an end of packet delimiter and may start counting bytes to look for specified fields. In this regard, the hardware, software and/or firmware module 312 may look for the magic packet indicator byte 422 described with respect to FIG. 4B. In instances when a magic packet is indicated, the hardware, software and/or firmware module 312 may continue to count bytes to find the EEN control instruction bytes 224, 226 and 428, for example, and may read EEN policy instructions from those bytes. When the PHY 202 device finds the end of frame delimiter byte 430, the PHY may discard the magic packet without transmitting it to a link partner. In this manner, the PHY device 202 may not need to implement a full packet engine and/or write information in a response to the layers above the MAC layer. The EEN "magic" packet may instruct the PHY device 202 to enter or exit LPI mode for example. In various embodiments of the invention, the EEN "magic" packet may indicate a duration of time that the PHY device 202 may remain in or out of LPI mode. Upon receipt of one or more EEN "magic" packets, the PHY device 202 may, for example, exit LPI mode ("wake") or may enter into LPI mode ("sleep"). In instances when the PHY device 202 receives a request for status of the PHY or for statistical information from registers for example, the PHY device may generate a packet to respond to the request. For example, the packet may comprise the requested statistical information and it may sent via the MAC controller 204 to the layers above the MAC layer 306 that requested the information.

In other embodiments of the invention, alternate methods of communication may be utilized to implement EEN control policy in the network device 400. For example, a combination of packet based communication and physical signaling may be utilized. In this regard, the physical signaling may comprise inter-packet gap signaling, a data packet preamble and/or a Q ordered sets, for example.

In accordance with an embodiment of the invention, the PHY device 200 may be operable to assist in implementation of the EEN control policy. The PHY device 202 may determine when to buffer packets and/or when to transmit and/or to receive packets to and/or from a link partner. In this regard, the PHY device 202 may comprise a FIFO and/or buffers that may comprise suitable logic, circuitry, interfaces and/or code that may be operable to store packets and/or frames prior to transmission. For example, in instances when the PHY device 202 is waking-up from a low(er) power mode, packets may be received from higher layers while the PHY device 202 may need time to transition to an operational state. The PHY device 202 may store packets in the FIFO and/or buffer until the PHY 202 is able to transmit them across the link. Similarly, a PHY within a link partner may also need to wake up and thus data may be buffered long enough for the PHYs in both link partners to exit LPI mode. In various embodiments of the invention, the MAC controller 204 may buffer packets.

The PHY device 202 may comprise timing and/or other parameters indicating the length of a sleep or wake cycle. Alternate signaling techniques between the PHY device 202 and MAC controller 204 may enable power mode transitions. The PHY device 202 may generate a frame for the MAC 204 that may instruct the MAC to enter a pause mode during a low(er) power mode and may generate a frame to exit the pause mode when exiting the low(er) power mode. Alternatively, the PHY may assert a carrier sense during low(er) power modes.

Figure 5:
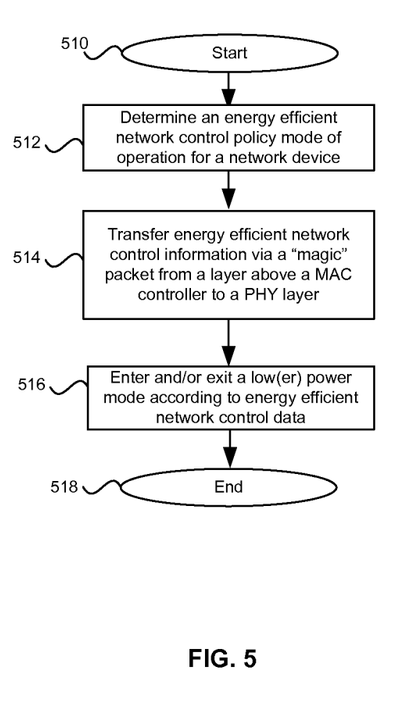
FIG. 5 is a flow diagram illustrating exemplary steps for implementing an energy efficient network control policy, in accordance with an embodiment of the invention.

FIG. 5 is a flow diagram illustrating exemplary steps for implementing an energy efficient network control policy, in accordance with an embodiment of the invention. The exemplary steps may begin with start step 510. In step 512, one or more layers implemented above the MAC controller 204 may determine an energy efficient network control policy 420 mode of operation for the network device 400. In step 514, one or more layers implemented above the MAC controller 204 may transfer energy efficient network control policy 420 information via a "magic" packet to the PHY device 202. In step 516, one or more layers within the network device 400 that may comprise the PHY device 202, may enter and/or exit a low(er) power mode according to the energy efficient network control policy 420 data. Step 518 may be an end of exemplary steps.

In an embodiment of the invention, an Ethernet network 100 comprising link partners 102 and 104 that are coupled via an Ethernet link 112, an energy efficient network (EEN) communication control policy 420 may be established above a media access control layer 204 by one or more OSI upper layer protocols 306. The EEN communication control policy 420 may determine a power level mode of operation for one or both of the link partners 102 and 104. In this regard, one or more of the OSI upper layer protocols may communicate control data comprising the determined power level mode to one or more physical layer (PHY) devices 110a, 110b and/or 202 in one or more of the link partners 102 and 104. The power level mode of operation may be implemented by one of more of the PHY devices 110a, 110b and/or 202 based on the communicated control data. Hardware, software and/or firmware 312 may be utilized by one or more of the OSI upper layer protocols 306 to establish and/or manage the EEN communication control policy 420. The control data may comprise information specifying when, where and/or how long to implement the power level mode of operation.

In various embodiments of the invention, the control data for the power level mode of operation may be communicated via a "magic" packet. The magic packet may comprise a start of frame delimiter, an end of frame delimiter and one or more bits that indicate the power level mode of operation. One or more of the PHY devices 110a, 110b and/or 202 may detect, parse and/or interpret the "magic" packet. Accordingly, the one or more PHY devices 110a, 110b and/or 202 and/or the network devices 102 and/or 104 may enter and/or exit a lower power mode of operation based on the communicated control data. The PHY devices 110a, 110b and/or 202 may respond to a magic packet by generating another magic packet and sending it to the layers above the MAC 204. While transitioning to an altered power level mode, the PHY device 110a, 110b and/or 202 may buffer packets that are pending transmission by the PHY device 110a, 110b and/or 202. Furthermore, the one or more OSI upper layer protocols 306 may buffer packets that are pending transmission by the PHY device 110a, 110b and/or 202 while transitioning to an altered power level mode of operation.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for packet based signaling between a MAC and a PHY to manage energy efficient network devices and/or protocols.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
   in an Ethernet network comprising link partners that are coupled via an Ethernet link, each of said link partners comprising one or more OSI physical layer (PHY) devices:
   in a first of said link partners:
      establishing by one or more OSI upper layer protocols that are above a media access control layer, an energy efficient network communication control policy, which determines a power level mode of operation for one or more of said link partners from among a plurality of power level modes of operation;
      communicating a packet by said one or more OSI upper layer protocols, said packet comprising control data and said control data comprising said determined power level mode of operation instructions, wherein said communicated packet is sent to a first of said one or more OSI physical layer devices within said first of said link partners, and wherein said control data comprises one or more bits indicating said power level mode of operation for said one or more of said link partners;
      identifying, parsing and reading said packet by said first of said one or more OSI physical layer devices within said first of said link partners, to determine said control data comprising said determined power level mode of operation instructions; and
      implementing said power level mode of operation by said first of said one or more OSI physical layer devices within said first of said link partners based on said determined control data within said packet.

2. The method according to claim 1, comprising establishing and managing said energy efficient network communication control policy by said one or more OSI upper layer protocols utilizing one or more of hardware, software and/or firmware.

3. The method according to claim 1, wherein said control data comprises information specifying when, where and/or how long to implement said power level mode of operation.

4. The method according to claim 1, comprising communicating said control data for said power level mode of operation instructions from said one or more OSI upper layer protocols that are above said media access control layer within said first of said link partners to said first of said one or more OSI physical layer devices within said first of said link partners via a magic packet.

5. The method according to claim 4, wherein said magic packet comprises a start of frame delimiter, an end of frame delimiter and one or more instruction fields that indicate said power level mode of operation.

6. The method according to claim 4, comprising:
one or both of:
- counting bytes by said first of said one or more OSI physical layer device devices within said first of said link partners, in order to recognize said magic packet; and
- reading instruction fields in said magic packet, and/or
- receiving a request, wherein a response to said magic packet is sent from said first of said one or more OSI physical layer devices within said first of said link partners to said one or more OSI upper layer protocols that are above said media access control layer within said first of said link partners.

7. The method according to claim 1, wherein said first of said one or more OSI physical layer devices and/or said first of said link partners enters or exits, a lower power mode of operation based on said determined control data.

8. The method according to claim 1, wherein said magic packet comprises an Ethernet packet of a standard or non-standard size or a packet determined via a different communication protocol.

9. The method according to claim 1, comprising buffering by said one or more OSI upper layer protocols, packets pending transmission by said first of said one or more OSI physical layer devices while transitioning to an altered power level mode of operation.

10. A system for communication, the system comprising:
a plurality of link partners coupled via an Ethernet link in an Ethernet network, wherein each of said plurality of link partners comprises one or more OSI physical layer (PHY) devices, one or more circuits for use in a first of said plurality of link partners, said one or more circuits comprising a first of said one or more OSI physical layer (PHY) devices, wherein said one or more circuits are operable to:
- establish by one or more OSI upper layer protocols that are above a media access control layer, an energy efficient network communication control policy, which determines a power level mode of operation for one or more of said plurality of link partners from among a plurality of power level modes of operation;
- communicate a packet by said one or more OSI upper layer protocols, said packet comprising control data and said control data comprising said determined power level mode of operation instructions, wherein said communicated packet is sent to said first of said one or more OSI physical layer devices within said first of said plurality of link partners, and wherein said control data comprises one or more bits indicating said power level mode of operation for said one or more of said link partners;
- identify, parse and read said packet by said first of said one or more OSI physical layer devices within said first of said plurality of link partners, to determine said control data comprising said determined power level mode of operation instructions; and
- implement said power level mode of operation by said first of said one or more OSI physical layer devices within said first of said plurality of link partners based on said determined control data within said packet.

11. The system according to claim 10, wherein said one or more circuits are operable to establish and manage said energy efficient network communication control policy by said one or more OSI upper layer protocols utilizing one or more of hardware, software and/or firmware.

12. The system according to claim 10, wherein said control data comprises information specifying when, where and/or how long to implement said power level mode of operation.

13. The system according to claim 10, wherein:
said one or more circuits are operable to communicate said control data for said power level mode of operation instructions from said one or more OSI upper layer protocols that are above said media access control layer within said first of said plurality of link partners to said first of said one or more OSI physical layer devices within said first of said plurality of link partners, via a magic packet.

14. The system according to claim 13, wherein said magic packet comprises a start of frame delimiter, an end of frame delimiter and one or more instruction fields that indicate said power level mode of operation.

15. The system according to claim 13, wherein said one or more circuits are operable to one or both of:
- count bytes by said first of said one or more OSI physical layer devices within said first of said plurality of link partners, in order to recognize said magic packet; and
- read instruction fields in said magic packet; and/or
- receive a request, wherein a response to said magic packet is sent from said first of said one or more OSI physical layer devices within said first of said plurality of link partners to said one or more OSI upper layer protocols that are above said media access control layer within said first of said plurality of link partners.

16. The system according to claim 10, wherein said first of said one or more OSI physical layer devices and/or said first of said plurality of link partners, enters or exits a lower power mode of operation based on said determined control data.

17. The system according to claim 10, wherein said magic packet comprises an Ethernet packet of a standard or non-standard size or a packet determined via a different communication protocol.

18. The system according to claim 10, wherein said one or more circuits are operable to buffer by said one or more OSI upper layer protocols, packets pending transmission by said first of said one or more OSI physical layer devices while transitioning to an altered power level mode of operation.

19. A system for communication, the system comprising:
one or more circuits for use in a first OSI physical layer device (PHY) of a first of a plurality of link partners coupled via an Ethernet link, said plurality of link partners each comprising a OSI physical layer device, wherein said one or more circuits are operable to:
- receive from one or more OSI layers above a MAC layer of said first of said plurality of link partners, a packet comprising energy efficient networking control policy information;
- detect and parse said energy efficient networking control policy information in said received packet;
- determine from said received packet, a low power mode of operation for implementation by one or more of said plurality of link partners from among a plurality of low power modes of operation, the received packet comprising one or more bits indicating said low power mode of operation for said one or more of said plurality of link partners; and
- transitioning said first OSI physical layer device from an active mode of operation to said low power mode of operation that is determined from said received packet.

20. The system according to claim 19, wherein said one or more circuits are operable to generate one or more packets comprising information corresponding to said received energy efficient networking control policy information, and communicate said one or more packets to one or more OSI layers above said MAC layer.

* * * * *